Nov. 20, 1962    D. H. MONTGOMERY    3,064,353
TOOL FOR TRIMMING GRASS AROUND SPRINKLER HEADS
Filed Nov. 2, 1960
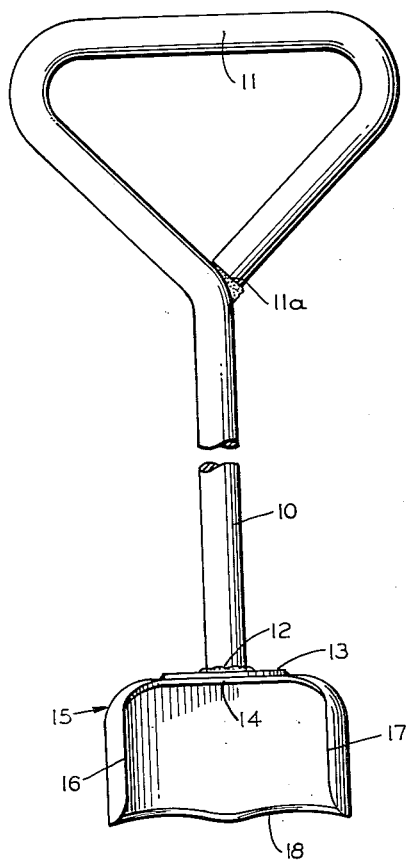
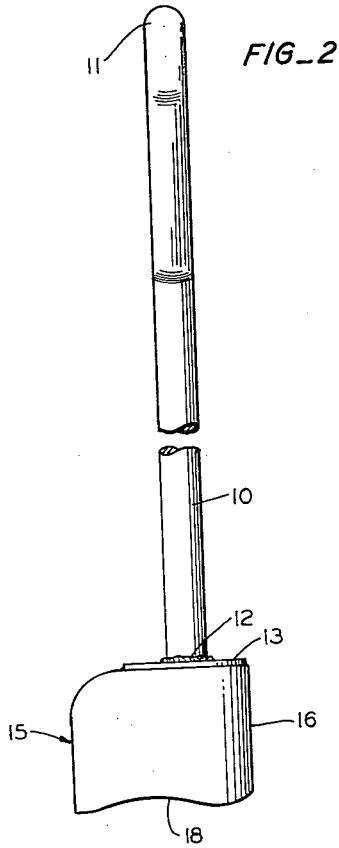
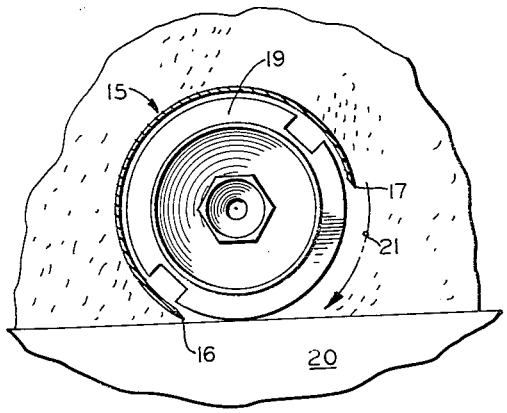
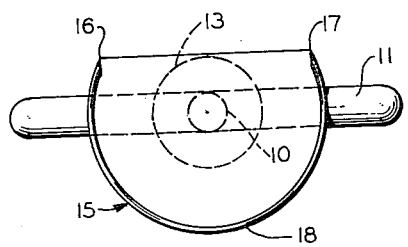
INVENTOR.
DOUGLAS H. MONTGOMERY
BY
Allen and Cherny
ATTORNEYS

United States Patent Office 3,064,353
Patented Nov. 20, 1962

3,064,353
TOOL FOR TRIMMING GRASS AROUND
SPRINKLER HEADS
Douglas H. Montgomery, 1084 Minnesota Ave.,
San Jose, Calif.
Filed Nov. 2, 1960, Ser. No. 66,878
2 Claims. (Cl. 30—300)

This invention relates to a manually operable tool for trimming the lawn grass around sprinkler outlets and the like.

An object of this invention is to provide an improved tool for trimming the lawn grass around sprinkler heads in an efficient and time saving manner.

Another object of this invention is to provide an improved manually operable tool for cutting the lawn grass around sprinkler heads including those sprinkler heads that are located adjacent to sidewalks, curbs or other permanent lawn borders.

Another object of this invention is to provide an improved manually operable tool in which the cutting element is mounted on the end of a long handle, said cutting element being more or less semi-cylindrical in shape and having the bottom edge thereof as well as side edges thereof sharpened so that these sharp edges may be used to trim the grass from around the sprinkler heads by a simple twisting or rotative movement of the tool.

Other and further objects of this invention will be apparent to those skilled in the art to which it relates from the following specification, claims and drawing.

In accordance with this invention, there is provided a manually operable tool for use in trimming the grass, turf or sod around sprinkler heads that are provided for irrigating lawns. For this purpose, the tool is provided with a handle of such length that the user of the tool does not have to stoop to do the trimming operation. The tool is also provided with a cutting element which is of a generally cup shape with a portion of the side thereof cut away and with the bottom open whereby the cutting element may be provided with sharpened edges around the bottom thereof and along the sides. Thus the cutting element has the advantage in that it may be easily placed around the sprinkler heads even if such heads are located adjacent to the sidewalk, curb or other permanent lawn edging. After the tool cutting element is located around the sprinkler head so that the sharp bottom cutting edge of the tool is lodged in the sod, the tool is given a twisting or rotating motion whereby the grass is cut away from around the sprinkler head.

The open side of the cutting element in addition to enabling the operator to locate the tool around the sprinkler head easily also enables the operator to use the tool for cutting grass away from the sprinkler head when the sprinkler head is located adjacent to the sidewalk or other lawn edging.

Further features of this invention will be set forth in the following specification, claims and drawing in which briefly:

FIG. 1 is a view in front elevation of an embodiment of this invention;

FIG. 2 is a view in side elevation of the same embodiment of this invention;

FIG. 3 is a bottom view showing the sharp cutting edges of the tool; and

FIG. 4 is a horizontal sectional view of the cutting element of this device positioned around a sprinkler head which is located adjacent to a sidewalk or similar lawn edging.

Referring to the drawing in detail, there is shown a preferred embodiment of this tool that is provided with a handle 10, the bottom 12 of which is welded to the disc shaped member 13 and the top portion of which is bent into a substantially triangular shape to provide a hand grip portion 11 of substantially straight configuration. This substantially triangular portion is welded at 11a so as to provide a closed loop and strengthen the hand grip portion thereof. The cutting element 15 is made of thin metal such as steel, which may be alloyed to give it sufficient hardness so that the cutting edges thereof will retain their sharpness during use for longer periods of time. This element may be formed out of sheet material by a suitable die if desired and its side wall is of substantially semi-cylindrical sleeve shape and open on one side.

The top 14 of the hollow open sided cup-shaped cutting element 15 is welded to the disc 13 and is thereby rigidly attached to the horizontal bottom of the handle. The bottom edge 18 of the cutting element 15 is of slightly wavy configuration and is sharpened from the inside out as shown in FIG. 1 to provide a sharp grass cutting bottom edge. The vertical sides 16 and 17 of the cutting element are also sharpened from the inside out as shown in FIGS. 3 and 4 and the bottom end portions of the sides 16 and 17 are curved and joined to the ends of the sharpened edge 18.

The diameter of the cutting element 15 is made somewhat greater than the diameter of the sprinkler head 19 as shown in FIG. 4 so that this cutting element may be placed around the sprinkler head with ample clearance. The sprinkler head 19 is of course visible through the cutaway or open side of the cutting element 15 while the cutting element is being located. After the cutting element is located around the sprinkler head, the bottom cutting edge 18 is pressed into the turf and the tool is then given a twisting motion as indicated by the arrow 21. This motion may be first in one direction and then in the other so that the sharp edges 16 and 17 are alternately moved toward and away from the sidewalk 20 or other lawn edging adjacent to which the sprinkler head 19 is positioned. This operation severs the grass that was overhanging the sprinkler head and exposes this sprinkler head so that water may be sprayed or released therefrom without obstruction from the grass. While this tool is very useful in trimming the grass from around sprinkler heads that are located adjacent to sidewalks and the like, it is of course also useful for trimming the grass overhanging sprinkler heads that are located well inside of the lawn area and which are not adjacent to sidewalks and other obstructions.

While I have shown a preferred embodiment of the invention it will be understood that the invention is capable of variation and modification from the form shown so that its scope should be limited only by the scope of the claims appended hereto.

What I claim is:

1. In a manually operable tool for trimming grass from around sprinkler heads and the like, the combination comprising a long handle having a hand gripping portion at its upper end, a substantially semi-cylindrical sleeve cutter member having a closed top, an open bottom and one open side, means for rigidly attaching said closed top of said cutter member to the lower end of said long handle, the edge of said open bottom and the opposite side edges of said open side being sharpened to provide horizontal and vertical cutting edges, said cutter member being adapted to be placed over a sprinkler head so that said sprinkler head extends up into said cutter member and is partially exposed through the open side of said cutter member, said sprinkler head engaging the inside upper part of said cutter member and acting as a guide for said cutter member as the latter is oscillated by the handle through an angle so that said sharp bottom edge and said sharp open side edges cut the grass extending to and over hanging said sprinkler head, said open side permitting use of the cutting member in instances where the sprinkler head is located adjacent a sidewalk or other lawn edging.

2. In a manually operable tool for trimming grass from around sprinkler heads and the like, the combination as defined in claim 1 and further comprising the said sharp bottom horizontal cutting edge being wavy in configuration to facilitate the severing of the grass during the use of the tool.

References Cited in the file of this patent

UNITED STATES PATENTS

| | | |
|---|---|---|
| 2,028,483 | Yahres | Jan. 21, 1936 |
| 2,691,823 | Dombrowski | Oct. 19, 1954 |
| 2,723,453 | Espitallier | Nov. 15, 1955 |
| 2,809,864 | Carr | Oct. 15, 1957 |